United States Patent
Schuerman et al.

(10) Patent No.: US 6,802,516 B2
(45) Date of Patent: Oct. 12, 2004

(54) CONVERTIBLE UTILITY CARRIER

(76) Inventors: Janet Schuerman, 1733 500th St. West, Stanchfield, MN (US) 55080; James Ehrler, 1733 500th St. West, Stanchfield, MN (US) 55080

(\*) Notice: Subject to any disclaimer, the term of this patent is extended or adjusted under 35 U.S.C. 154(b) by 39 days.

(21) Appl. No.: 10/095,686

(22) Filed: Mar. 14, 2002

(65) Prior Publication Data

US 2002/0185833 A1 Dec. 12, 2002

Related U.S. Application Data

(60) Provisional application No. 60/276,545, filed on Mar. 16, 2001.

(51) Int. Cl.[7] ................................................ B62B 3/02
(52) U.S. Cl. ........................ 280/47.371; 280/79.2; 280/30
(58) Field of Search ................. 280/47.34, 30, 280/47.371, 47.35, 79.2, 87.01

(56) References Cited

U.S. PATENT DOCUMENTS

| | | | | |
|---|---|---|---|---|
| 5,259,215 A | \* | 11/1993 | Rocca | 62/371 |
| 5,277,449 A | \* | 1/1994 | Schmidt | 280/655 |
| 5,449,224 A | \* | 9/1995 | Johnson | 298/2 |
| 5,558,359 A | \* | 9/1996 | Phears | 280/654 |
| 5,794,957 A | \* | 8/1998 | Mendon | 280/204 |
| 5,921,574 A | \* | 7/1999 | Driessen et al. | 280/655.1 |
| 6,010,145 A | \* | 1/2000 | Liu | 280/655.1 |
| 6,053,515 A | \* | 4/2000 | Kelley | 280/47.18 |
| 6,079,720 A | \* | 6/2000 | Spear et al. | 280/47.371 |
| 6,186,566 B1 | \* | 2/2001 | Frederickson | 294/15 |
| 6,220,611 B1 | \* | 4/2001 | Shapiro | 280/47.34 |
| 2002/0074764 A1 | \* | 6/2002 | Allen et al. | 280/204 |

\* cited by examiner

Primary Examiner—Avraham Lerner

(57) ABSTRACT

An apparatus for carrying cargo having a tub shaped cargo container with upwardly extending walls for surrounding and containing cargo and having one of said walls extending upwardly at an acute angle forming a dumping surface; the cargo carrier further having a plurality of ribs and a corresponding plurality of grooves formed on the bottom thereof, and further having a first attachment point formed adjacent the dumping surface, a frame having an inverted "U" shaped platform, the frame having a distal end and a proximal end, a "U" shaped rear axle affixed to the distal end of the frame, the rear axle extending outwardly and thence downwardly and terminating in a means for attaching wheels; the rear axle further having a circular wheel attached to each end of the rear axle; an inverted "U" shaped front axle pivotally attached to the proximal end of the frame, the front axle extending outwardly and thence downwardly and terminating in a means for attaching wheels; the front axle further having a circular wheel attached to each end of the front axle; the front axle further having a triangular shaped sub-frame extending proximally therefrom; the sub-frame having a first attachment point formed thereon; and an elongate handle having a "D" shaped proximal end and a distal end the distal end of the handle pivotally attached to a second attachment point the second attachment point adapted to selectively attach to a first attachment point.

21 Claims, 9 Drawing Sheets

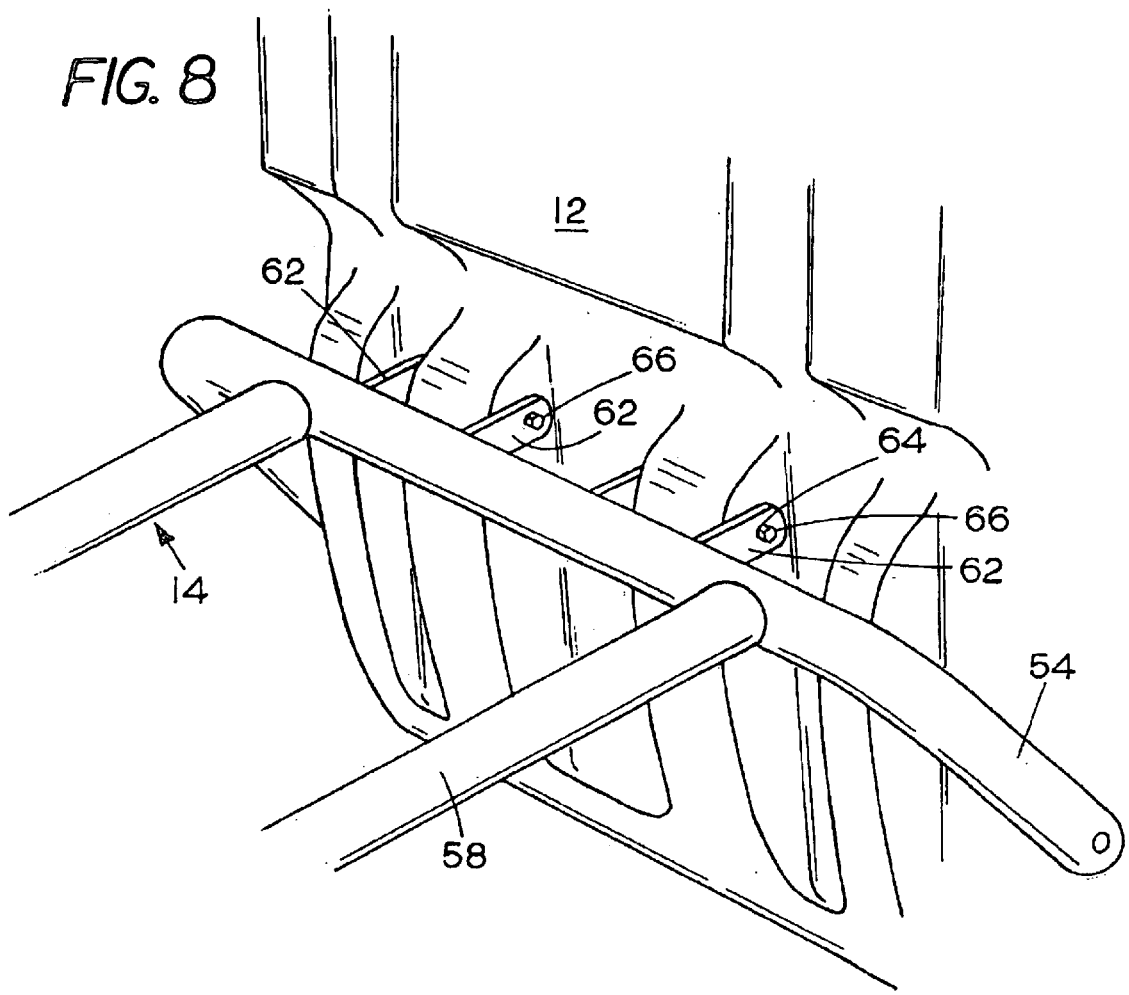
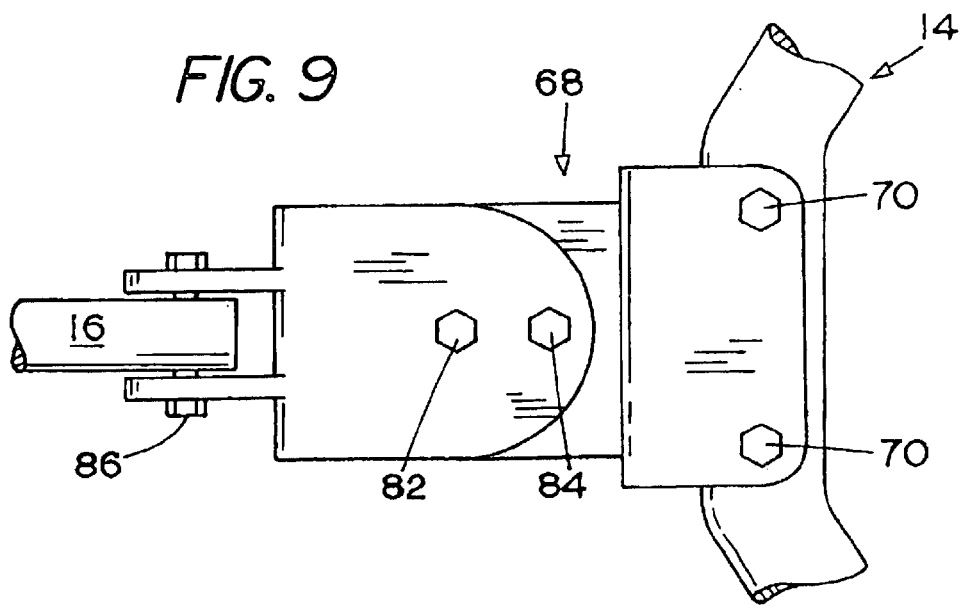

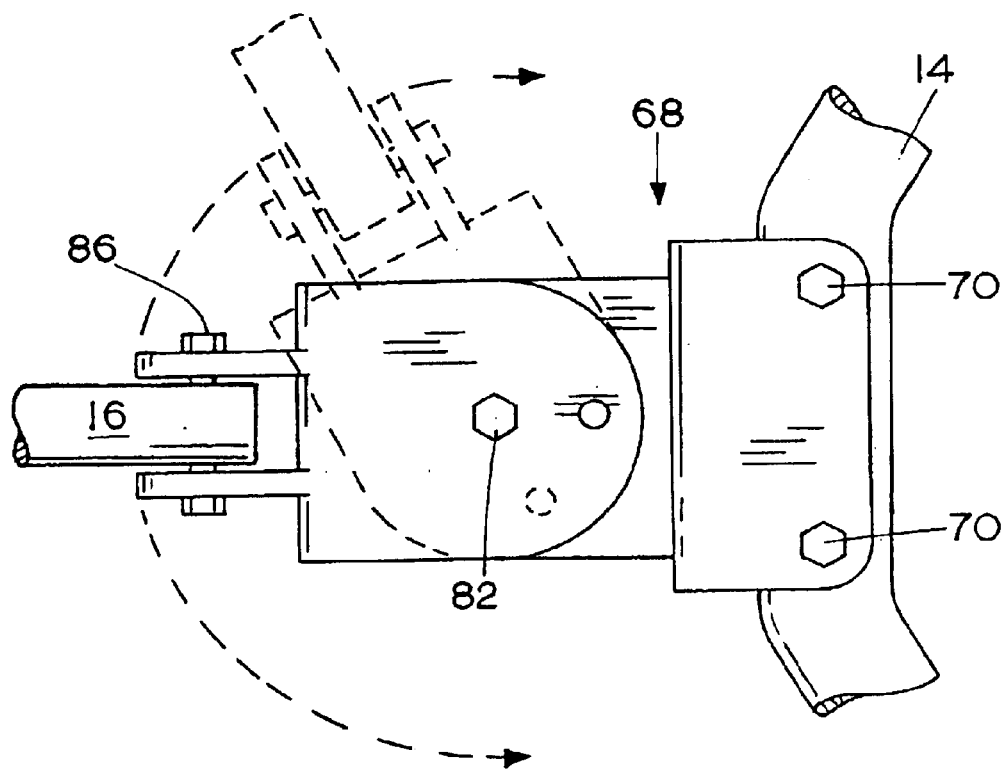
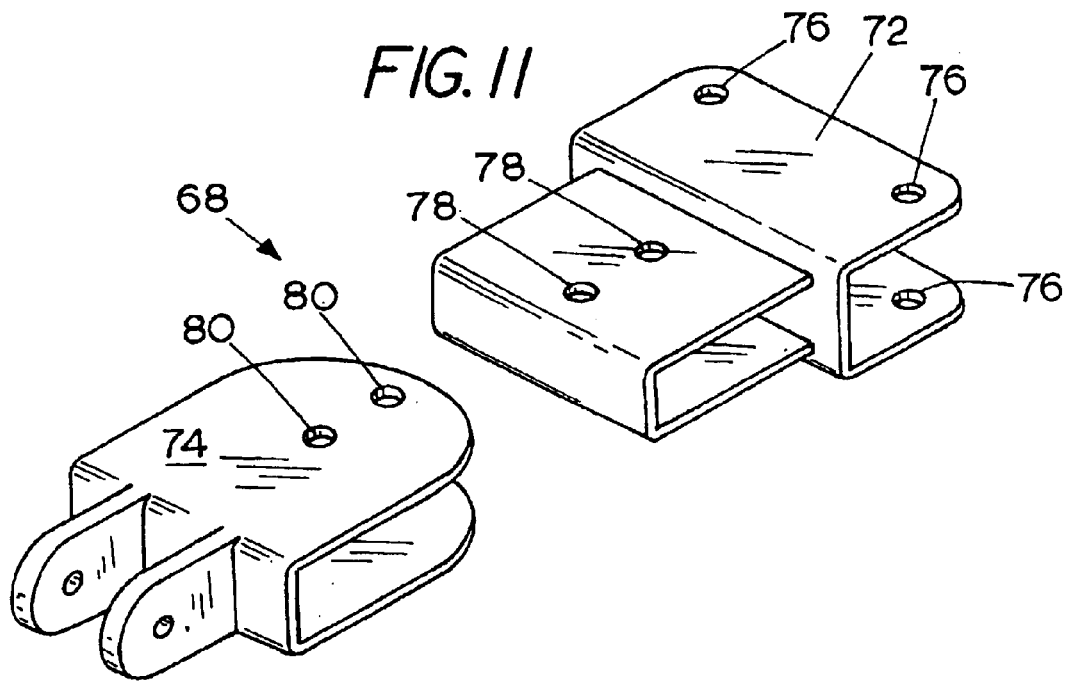

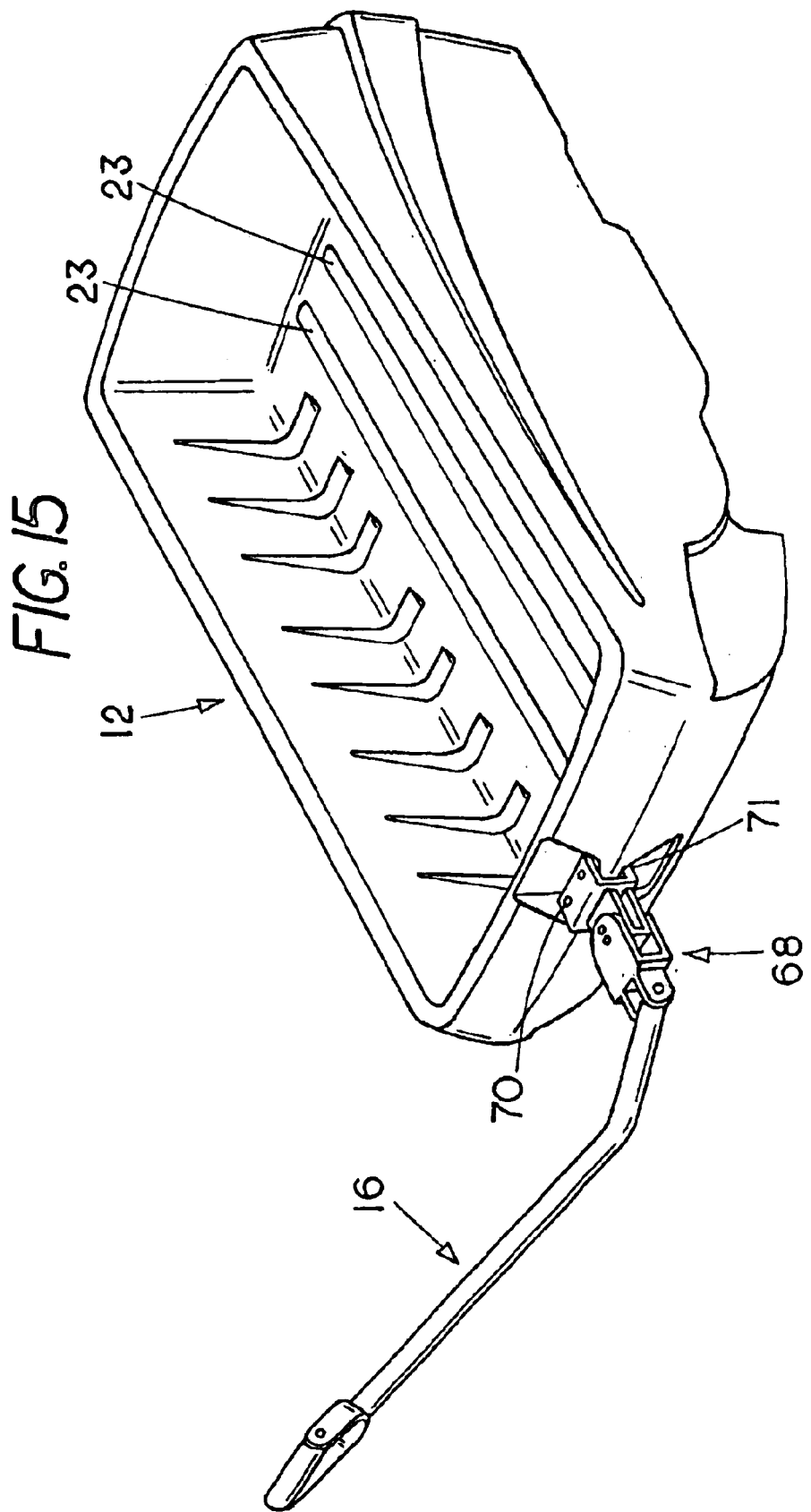

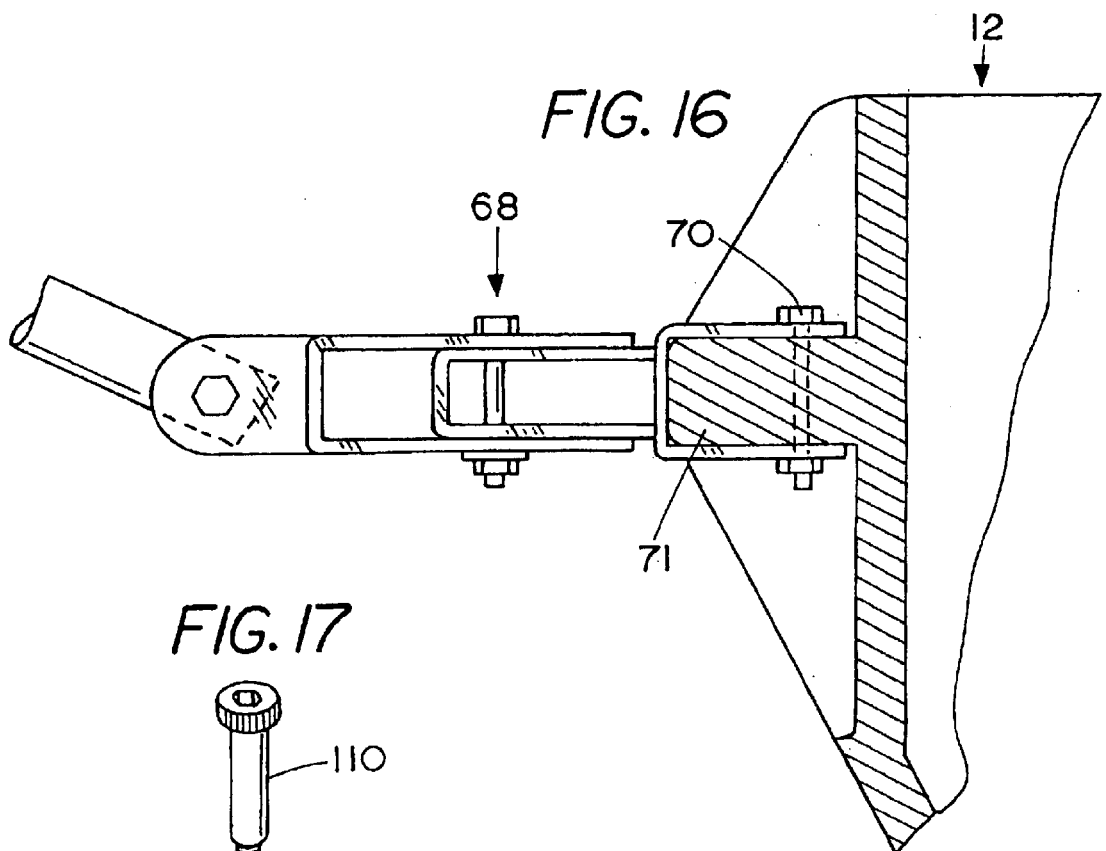
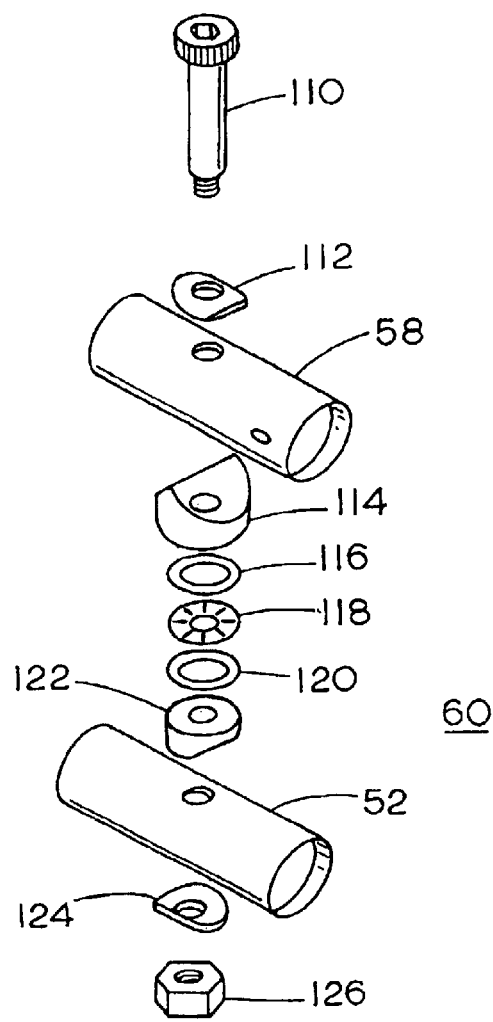

CONVERTIBLE UTILITY CARRIER

The present invention relates to utility carriers and more specifically to utility carriers that can be used in multiple configurations which claims priority from a provisional patent application Ser. No. 60/276,545 filed Mar. 16, 2001 entitled CONVERTIBLE UTILITY CARRIER.

While the prior art is replete with utility carriers of numerous varieties, all suffer from one or more shortcomings. Some of the small carriers, while being easy to load and maneuver in restricted spaces simply do not have the carrying capacity necessary for some of the larger loads that can be expected. Similarly, the larger carriers, while being able to carry prodigious amounts of cargo cannot be maneuvered in to restricted spaces. An additional problem with the larger carriers is that when filled with a bulk product, the large carriers can be quite difficult to empty.

One class of conventional carriers is wheeled carriers that are quite able to be moved over a hard surfaced area, but, can become readily mired when operation is attempted on soft surfaces. Another class of carriers is sled type carriers, that is, those carriers having no wheels that are dragged or slid over the surface. Such carriers have been known for several millennia and are quite useful for moving materials over a soft surface. However, the amount of energy needed to drag a loaded sled over anything but the most slippery surface obviates any benefit that may incur from moving the load in a carrier. The sled type carriers therefore are only useful when the working surface is slippery such as ice or snow. Neither class of the conventional carriers is readily convertible between a wheeled carrier and a sled type of carrier.

What is needed is a dumpable utility carrier that may be used as both a wheeled carrier and sled type carrier so that a user may use the carrier year around for multiple uses on multiple surfaces.

SUMMARY OF THE INVENTION

The invention as disclosed in this application is a cargo carrier having a tub shaped cargo portion with upwardly extending sides surrounding a base to contain the cargo carried in the cargo portion. The carrier may be selectively placed on the snow or other suitable surface and drawn like a sled or placed on a wheeled frame and drawn over a harder surface.

The invention includes a carrier having substantially upright walls surrounding a platform forming the cargo portion. The walls may be vertical or the walls may be sloped and enclose a volume for carrying goods. The bottom of the carrier has a plurality of grooves and ribs therein to allow the cargo portion to be drawn across snow or ice with reduced friction and provide a direction stabilizing effect. The carrier may have a closable top cover. The carrier may be attached to a wheeled carriage for use on hard surfaces. When so attached, the cargo portion may be pivoted at the rear of wheeled carriage to dump the contents of the carrier. When the cargo portion is attached to the wheeled carriage, the grooves of the carrier mate with longitudinal tubes of the frame to locate and stabilize the carrier on the carriage. When the cargo carrier is used in its sled form, the bottom ridges function as runners.

For moving the carrier about a standard "D" type of handle may be selectively attached to either the frame or the cargo portion. When the handle is attached to the frame, the handle may pivot in a vertical plane to accommodate users of varying heights and does not pivot in a horizontal plane so that when the handle is moved in a horizontal plane, the wheels of the frame are turned to steer the utility carrier. When the handle is attached to the cargo portion, the handle may pivot in both a horizontal plane and a vertical plane allowing the cargo portion to be both pulled and steered in the snow or other slippery surface.

An advantage of the current invention is that cargo carrier that may be used to carry a multitude of items useful to a homeowner.

Another advantage of the current invention is that the cargo carrier may be selectively pivoted to dump bulk cargos.

Another advantage of the current invention is that the cargo carrier may be pivoted over center to be self supporting in the dumping position.

Another advantage of the current invention is that the attachment points of the cargo carrier is attached to the frame near the center of gravity of the cargo carrier to counterweight the load allowing the cargo carrier to be more easily dumped.

Another advantage of the current invention is that the cargo carrier may be used with wheels on hard surfaces and without wheels on soft surfaces.

Another advantage of the current invention is that the cargo carrier may have openable doors on the top to allow the cargo to be protected from the environment or for security.

Another advantage of the current invention is to provide openable doors on top that may be locked on a vertical position to increase the cargo capacity.

Another advantage of the current invention is to provide openable doors that may be locked in a horizontal position outside the cargo tub to provide a shelf for tools or the like.

Another advantage of the current invention is to provide openable doors that may be locked in a horizontal position outside the cargo tub to provide a horizontal fixture that may be used a movable work bench.

A further advantage of the current invention is that the ribs of the interior of the cargo tub that provide structural integrity are unidirectional to allow bulk cargo to loaded and dumped without trapping such cargo.

A further advantage of the current invention is that one handle may be attached to either the carrier or the carriage to provide ease of movement of the carrier in both forms.

The utility carrier is a dumpable utility carrier that may be used as both a wheeled carrier and sled type carrier so that a user may use the carrier year around for multiple uses on multiple surfaces.

BRIEF DESCRIPTION OF THE DRAWINGS

FIG. 8 is an enlarged partial perspective view showing the attachment of the cargo carrier to the frame.

FIG. 9 is plan view of handle coupler showing the attachment of the handle coupler to the frame.

FIG. 10 is plan view of handle coupler showing the pivotal attachment of the handle coupler to the frame FIG. 11 is an enlarge perspective view of the handle coupler.

FIG. 15 is a perspective view of the cargo carrier with the handle attached for use as a sled.

FIG. 16 is a partially cut away cross sectional view showing the handle pivotally attached to the cargo carrier.

FIG. 17 is a partially cut-away exploded detailed view of the bearing assembly.

DETAILED DESCRIPTION

The present invention 10 is a utility carrier convertible between a wagon, a trailer, a cart and a sled. Major components include the cargo portion 12, frame 14 and handle 16. Each is selectively securable to each other to form various configurations of a utility carrier.

Figure 1:
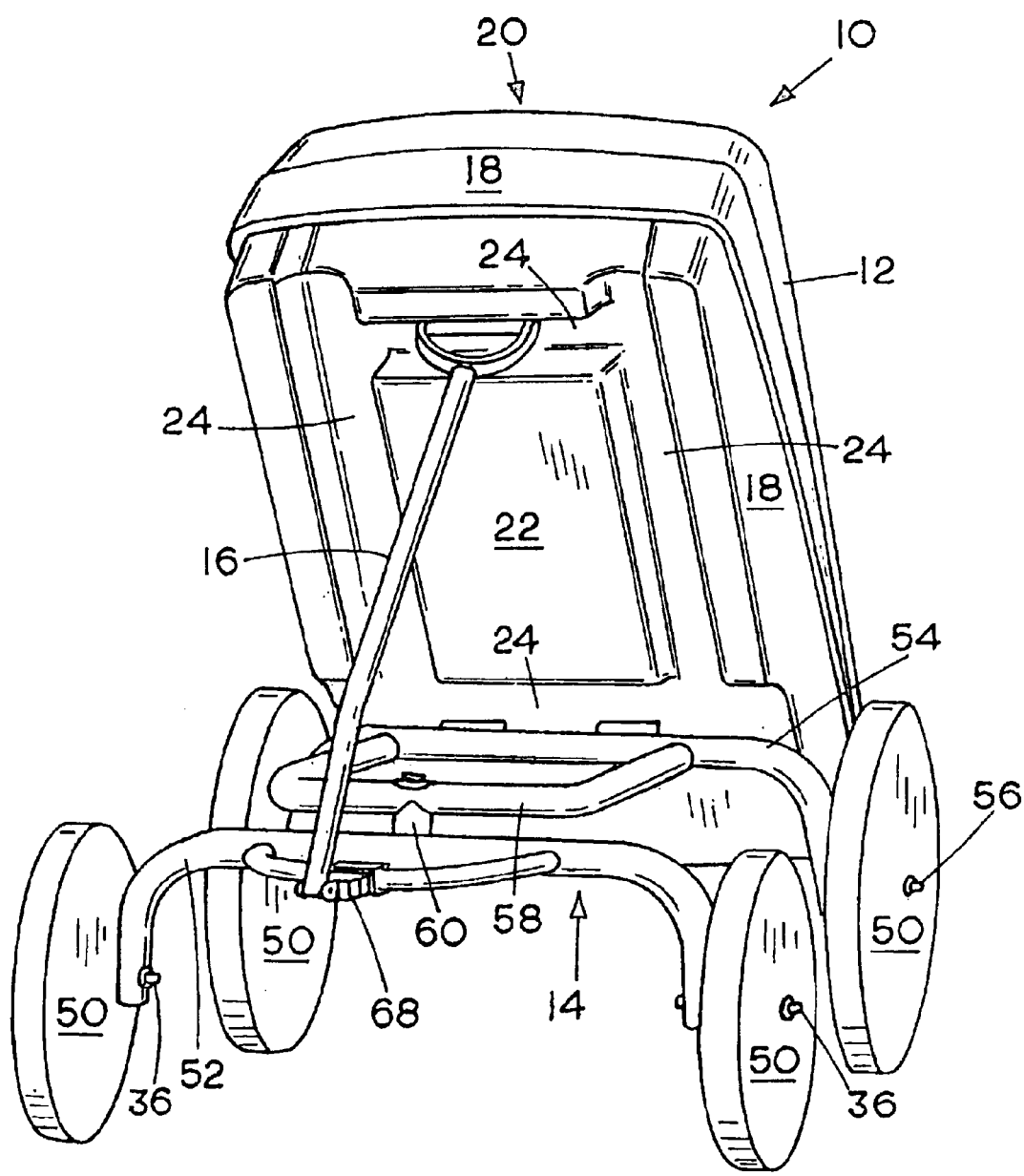
FIG. 1 is a perspective view of the invention showing the cargo carrier in a supported, raised position supported by the handle.

The cargo portion 12 may generally be tub shaped suitable for retaining objects therein. Cargo portion 12 is preferably formed of a self-lubricated polymer that is durable. The polymer provides an advantage of easily being molded to shape, including useful features for connection of the cargo portion 12 with the frame 14 and handle 16. Self-lubrication provides the advantage of allowing smooth trailing of the cargo portion 12 when used as a sled. The cargo portion may have four walls 18, an upwardly facing bowl portion 20 and a bottom wall 22. The walls 18 may be vertical or angled outwardly from the bottom wall 22 of the cargo portion 12. It is preferred that wall 18 proximate the rear axle 54 be angled outwardly to facilitate the dumping of bulk cargo. The bottom wall 22 may have grooves 24 suitable for engaging with the frame 14 and to provide unidirectional tracking of the sled. The cargo portion 12 may include a drain hole in the bottom thereof if desired to empty liquids therefrom. The cargo portion 12 may be propped up in the dumping position as shown in FIG. 1, which advantageously converts potentially a two person dumping job into an easy one person job. Alternatively, the cargo portion may be lifted and rotated to more than ninety degrees to completely empty the cargo portion 12. Interior ribs 23 as shown in FIG. 15 are designed to both strengthen the sled walls and act to direct material out of the sled whilst dumping.

The cargo portion 12 may be fabricated from any suitable material such as formed or welded metal or a polymer or fiber filled polymer. Suitable materials would include low and high density polyethylene, polypropylene, polycarbonates, acrylic polymers and copolymers, and any other material having suitable properties to provide ease of fabrication while being a slippery surface for use as a sled.

Figure 2:
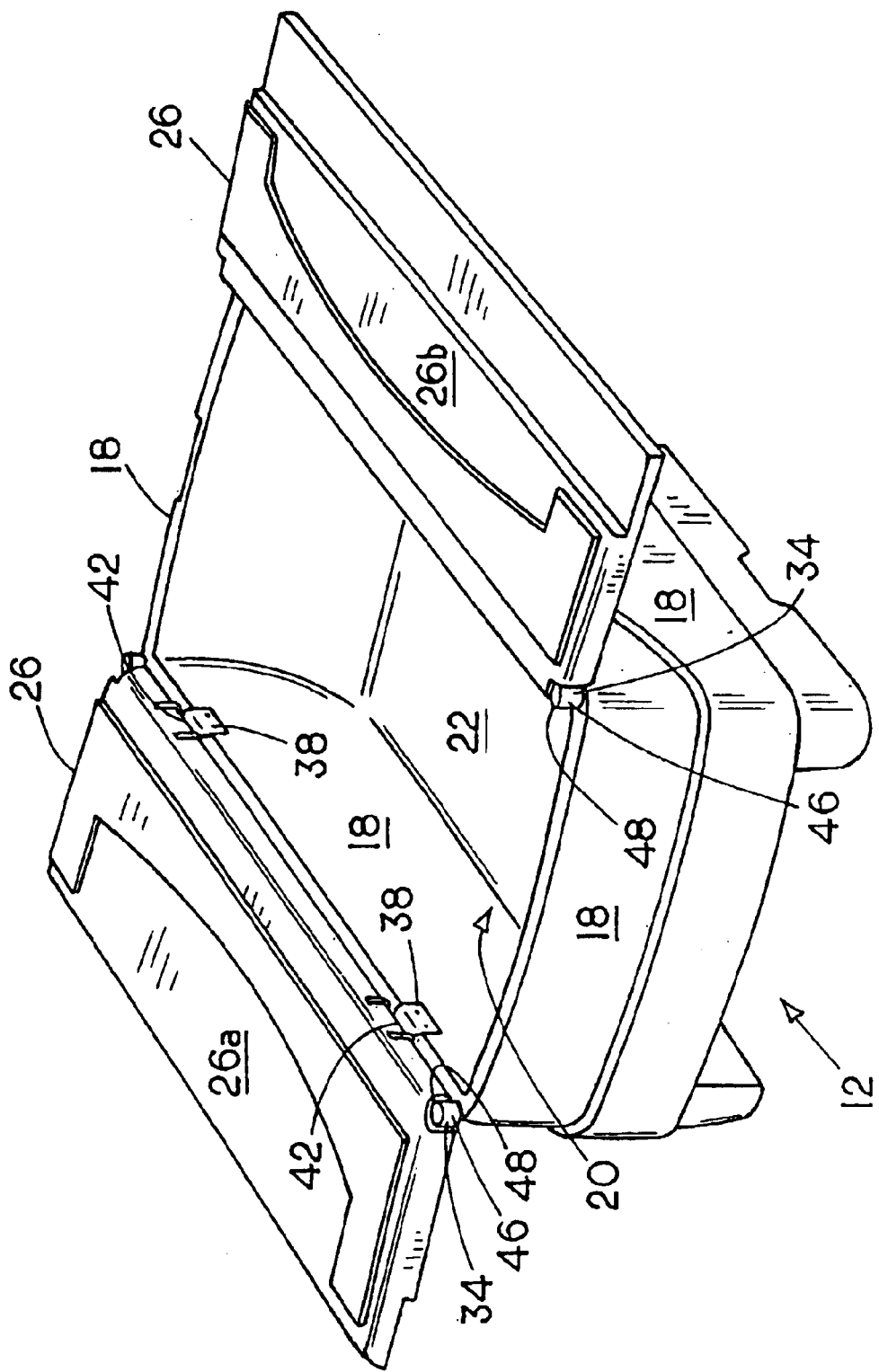
FIG. 2 is an overhead perspective view of the cargo carrier of the invention with the top covers of the cargo carrier in an open position.
Figure 3:
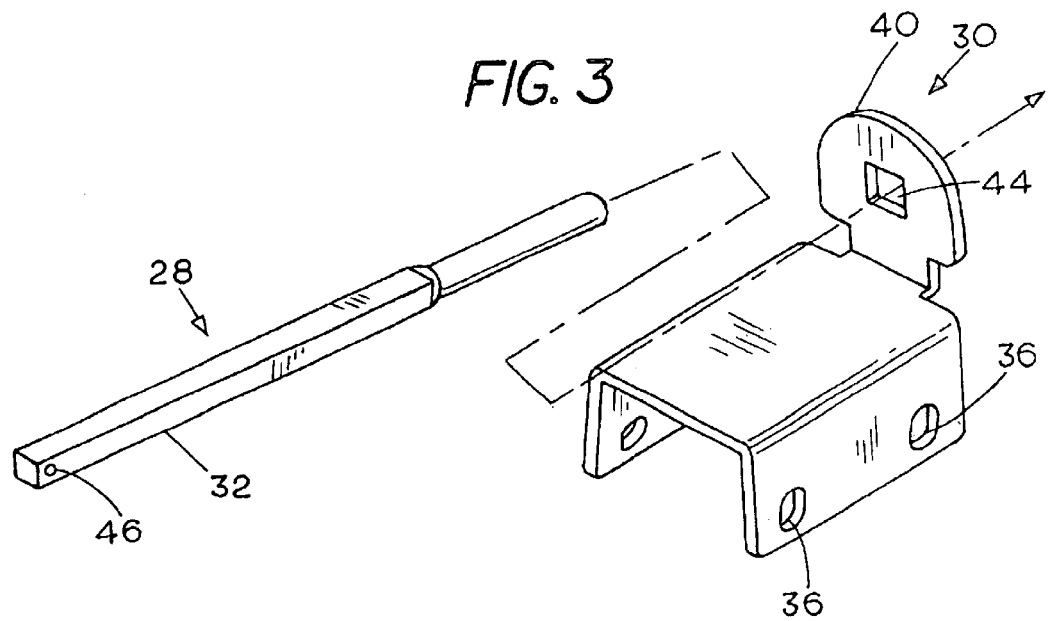
FIG. 3 is a an exploded view of a hinge used to connect a cover to the cargo carrier.
Figure 4:
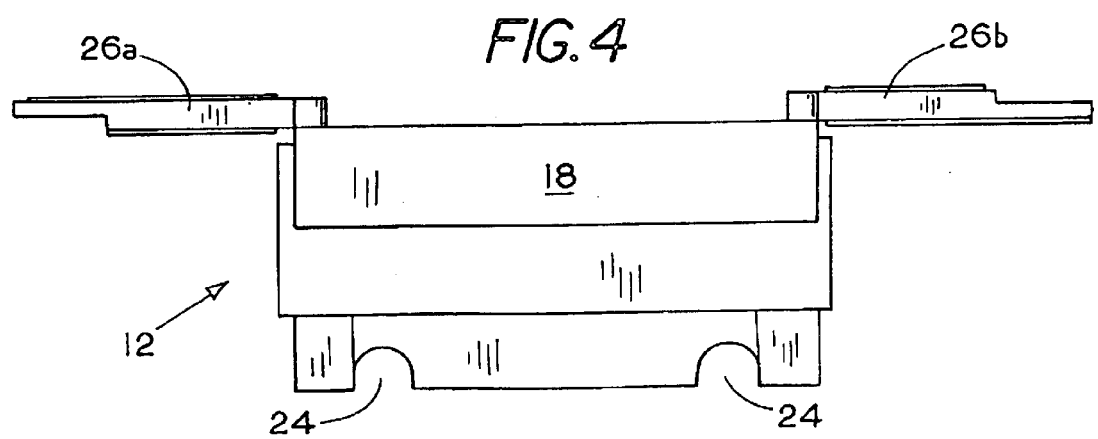
FIG. 4 is an end view of the cargo carrier showing the cover of the cargo carrier in an open position.
Figure 5:
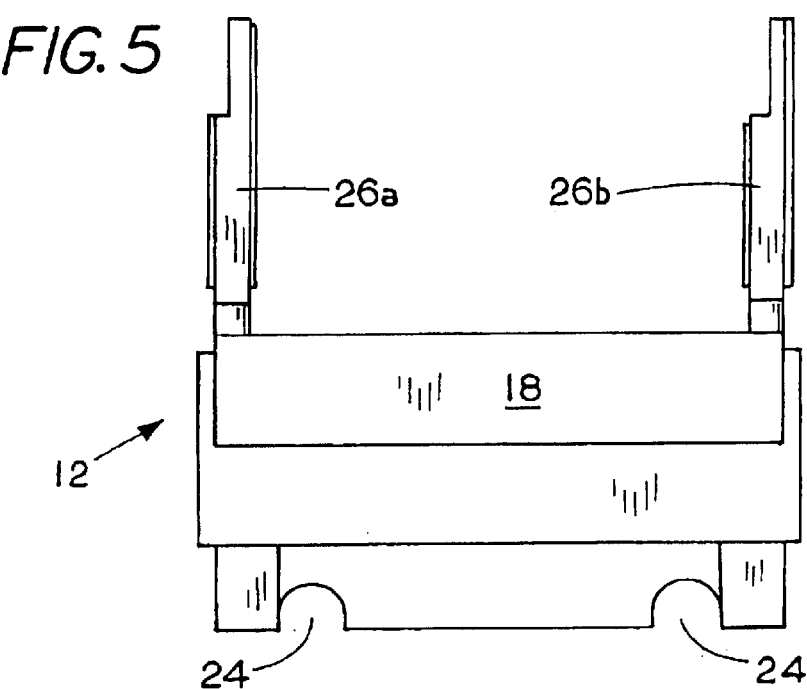
FIG. 5 is an end view of the cargo carrier showing the cover of the cargo carrier in an partially open position.
Figure 6:
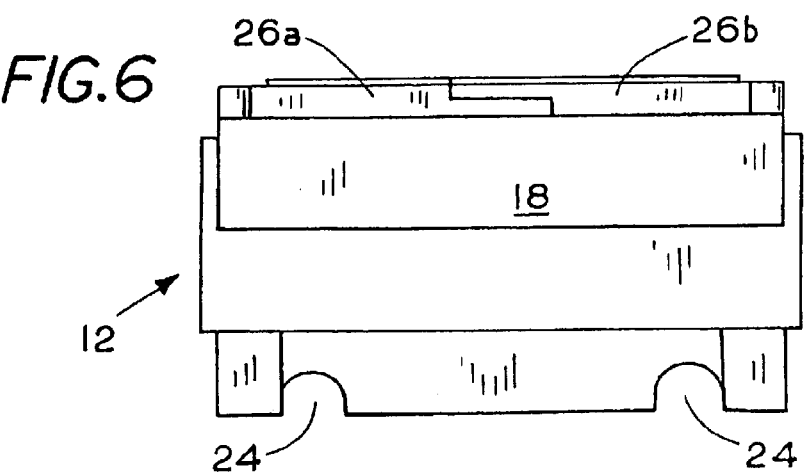
FIG. 6 is an end view of the cargo carrier showing the cover of the cargo carrier in a closed position.

Referring to FIGS. 2–6, cargo portion 12 may include a cover 26 hingedly secured to walls 18. FIG. 2 shows cover portions 26a and 26b in an open position from a perspective view. FIG. 4 shows cover portions 26a, 26b in an open position from an end view. FIG. 5 shows the cover portions 26a, 26b partially closed and FIG. 6 shows them fully closed. Note that cover portions 26a and 26b may form an overlapping engagement as shown. This provides an advantage of structural integrity when heavy strain is place on the cargo portion 12. The cover 26 may be selectively removed for some uses by removing the inserts 32 and removing the covers 26a, 26b.

FIGS. 2 and 3 show the hinge 28, including a coupler 30, an insert 32 and a channel 34 defined through an edge of either cover 26a or 26b. The coupler 30 is joined to wall 18, and fastened thereto through apertures 36 with fasteners 38. The aperture 36 may be slotted to allow some adjustment of the coupler 30 to provide a better fit with the cover 26. There are typically two couplers 30 per cover section. Projections 40 insert through slots 42 in the cover 26, extending into the channel 34 defined therethrough. Apertures 44, which may be square, X-shaped, or any other suitable shape and sized and shaped to snugly receive the insert 32 therethrough. Alternatively, insert 32 may be flat and aperture 44 may be flat or X-shaped. The insert 32 extends through channel 34, passing through apertures 44, until the stop 46 is positioned within the receiver portion 48 of the cover 26 where it may be releasably held. Constructing the hinge in this manner gives easy positive attachment of the cover 26 along its entire edge thereof. Note that the insert 32 and couplers 30 do not rotate, but rather the cover 26 rotates about the insert 32.

Figure 7:
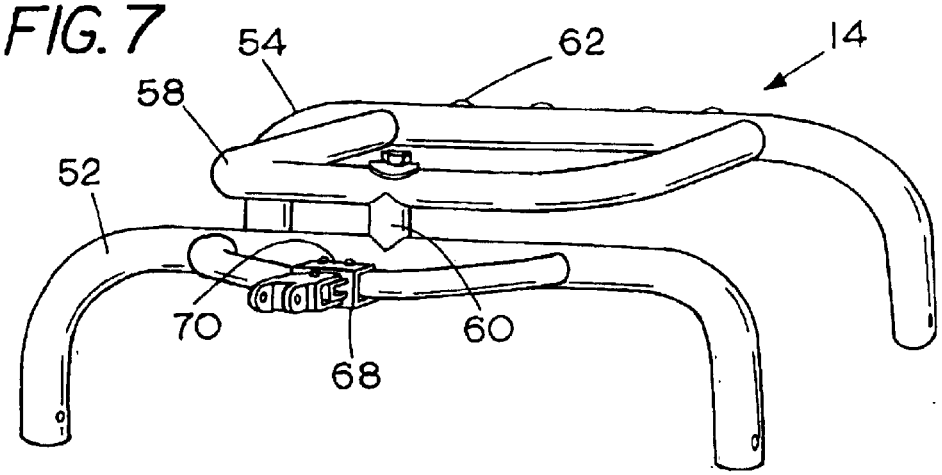
FIG. 7 is a perspective view of the frame of the utility carrier.

Referring to FIGS. 1, 7, and 8, the frame 14 may be supported on a plurality of wheels 50 joined to an inverted "U" shaped front and rear axles 52, 54 with bolts 56. A "U"-shaped platform 58 in combination with a bearing assembly 60 may join the front and rear axles 52, 54 as shown. The bearing assembly 60 allows the front axle 52 to rotate relative to the platform 58 and is preferably of sufficient length to allow the front axle 52 and wheels 50 to rotate under the platform 58, providing a tighter turning radius. The shape of the front and rear axles 52, 54 provides an advantage of maximum ground clearance, while the platform 58 may be of suitable size and configuration for joining axles 52, 54; supporting the cargo portion 12; and securement to the handle 16.

The frame 14 may be fabricated from any suitable material such as a high strength stiff polymer or glass filled polymer or of metal tubes. The metal tubes may be square or round and are preferably round for ease of manufacturer. The metal tubes further may be of ferrous or non-ferrous material and are preferably a thin walled aluminum alloy combining the light weight and strength properties of aluminum.

The bearing assembly 60 is located between the "U" shaped platform 58 and the front axle 51 and provides a pivotal connection therebetween. The bearing assembly 60 has a shoulder bolt 110 passing through, in order, an upper formed washer 112, the "U" shaped platform 58, an upper bearing holder 114, an upper bearing washer 116, a bearing 118, a lower bearing washer 120, a lower bearing holder 122, through the front axle 52, a lower formed washer 124, and is secured in the nut 126. The bearing holders 114, 122 allow the use of a flat bearing between the tubular frame 58 and the tubular axle 52. The washers 116, 120 support the bearing 118 and separate the bearing 118 from the bearing holders 114, 122. The bearing 118 may be any suitable low friction bearing such as a brass or bronze plate, and is preferably a friction reducing bearing such as a roller or needle bearing.

The use of a shoulder bolt 110 allows the nut 126 to be tightened against the shoulder 128 of the shoulder bolt 110 so that the bearing assembly 60 may be fastened securely and properly tensioned the bearing 118 without the risk of the bolt 126 being over tightened and damaging the bearing 118 or crushing the front axle 52 or the "U" shaped platform 58.

Projections 62 with apertures 64 may extend from frame 14 and rotatably secure to the cargo portion 12 with releasable fasteners 66 as shown in FIG. 8. Rotatable mounting provides the benefit of easy dumping of the contents in the cargo portion 12 by rotating the cargo portion 12. Rotation of the cargo portion 12 to a fully uplifted position provides access to the releasably fasteners 66 should the user wish to change the configuration of the invention 10 between a trailer, wagon, or a sled.

The rear frame 54 is angled forward to place projections 62 with apertures 64 nearer the center of gravity of the sled 12. Thus when dumping the sled 12, any part of the sled 12 and cargo positioned rearward of the apertures 64 acts as a counterweight to minimize the effort required to raise the sled 12 into dumping position.

Figure 12:
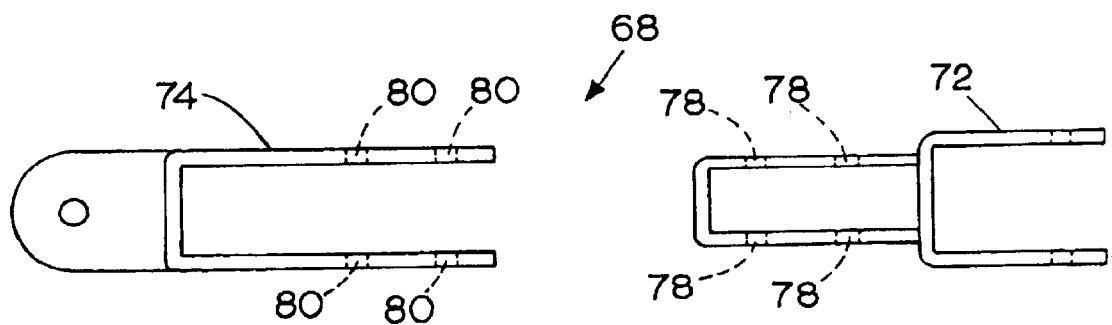
FIG. 12 is a cross sectional view of a handle coupler taken along line 12—12 of FIG. 11.
Figure 13:
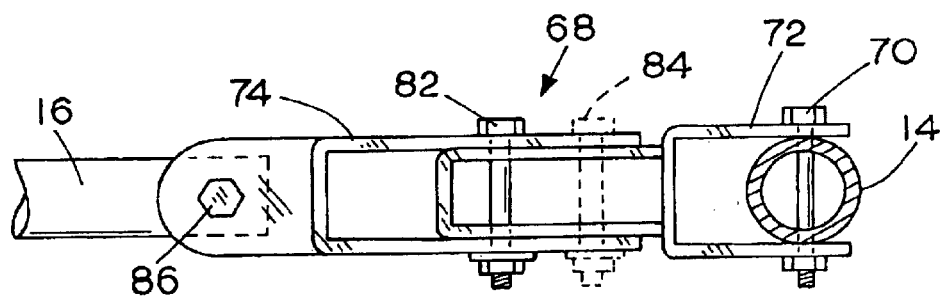
FIG. 13 is a cross sectional view similar to FIG. 12 showing the handle coupler in an assembled position.

The frame 14 may join to the handle 16 as shown in FIG. 1 with coupler 68. FIGS. 7, 9 and 10 show the coupler joined to the frame 14 with releasable fasteners 70 or to the cargo portion 12 as shown in FIGS. 15 and 16 to attachment point 71. The preferred construction of the coupler, is shown in FIG. 11, 12, and 13.

The coupler 68 may include first and second portions 72, 74 shown in FIG. 11. Apertures 76 in the first portion 72 are designed to receive fasteners 70 as described above. Apertures 78 cooperate with apertures 80 defined in the second portion 74. FIGS. 12 and 13 show the coupler 68 from a side view. Fasteners 82, 84 extend through apertures 80 to provide a fixed securement of the first coupler portion 72 to the second coupler portion 74. Fastener 82, as shown, allows rotation of the second coupler portion 74 relative to the first coupler portion 72 if the fastener 84 (shown in phantom) is removed. This fixed/rotatable relationship is illustrated in FIGS. 9 and 10. The second coupler 74 joins to the handle 16 via fastener 86. Fastener 86 may be either loosened to either allow the handle 16 to rise and fall freely or tightened to maintain the handle 16 in a vertical position selected by the user. While the coupler 68 may be used in either the fixed or rotatable position when the cargo carrier 10 is used as a wheeled carrier or a sled carrier, it is preferred that the coupler 68 be used in its fixed position when the cargo carrier 10 is used as a wheeled carrier and the coupler 68 by used in its rotatable position when the cargo carrier 10 is used as a sled carrier.

Figure 14:
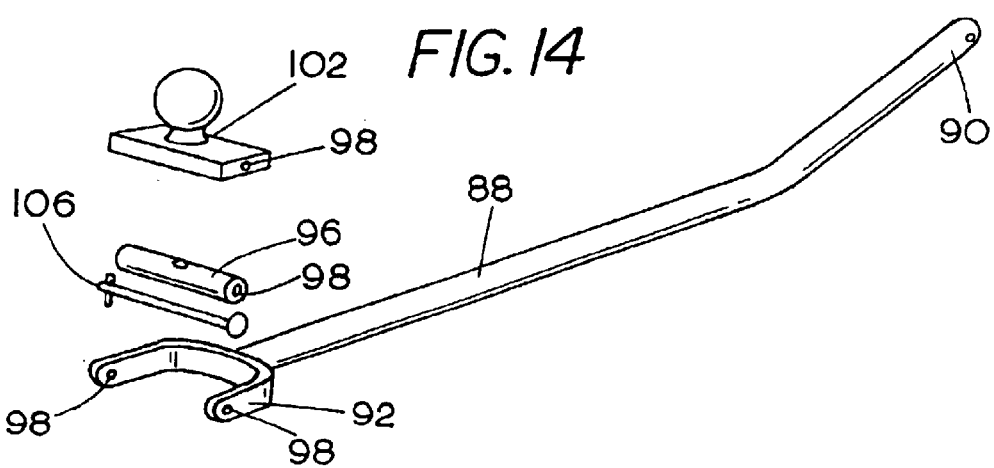
FIG. 14 is an exploded view of a handle assembly.

Handle 16, shown in FIG. 14, may include a shaft portion 88 with a coupler engaging end 90 and a grasping end 92. The coupler end 90 joins to the second coupler second portion 74, while the grasping end 92 may be grasped by a user or attached to a vehicle. A rod 96 may be secured to the grasping end 92 through apertures 98 with a releasable fastener 100. Rod 96 is suited for a users hand. A hitch 102 of a variety of sizes and shapes may likewise be secured to the grasping end 92 of handle 16 through apertures 98 and a releasable fastener. 100. The shaft portion 88 of the handle 16 may be of any suitable shape, such as, round or square, and is preferably square in cross section. The handle 16 shaft portion 88 may be fabricated of any suitable materials such as metal or metal tube or man made materials such as polymers or glass filled polymers.

In operation, the user may select to have a sled without or with a handle 16 as shown in FIG. 15, simply by removing the frame 14 and either attaching handle 16 or not, as described above. A cart may be formed via attaching the cargo portion 12 to the frame 14 and removing the handle 16 from the cargo portion 12 and reattaching the handle 16 to the front axle 52. The present invention 10 may be a wagon when the cargo portion 12, frame portion 14 and handle portion 16 with rod 96 are joined together into one unit. Rod 96 may be interchanged with hitch 102 to form a trailer for a variety of vehicles.

Although the present invention has been described with reference to preferred embodiments, workers skilled in the art will recognize changes may be made in form and detail without departing from the spirit and scope of the invention.

We claim:

1. An apparatus for carrying cargo comprising:
   a) a tub shaped cargo carrier having a base and walls for surrounding and containing the cargo and a first attachment point; and a first handle attachment point;
   b) a selectably attachable mobile base, the mobile base being pivotally attached to the cargo carrier at the first attachment point, and having a front wheel mechanism, a rear wheel mechanism, and a frame; the rear wheel mechanism being attached to the frame and further including a pair of wheels rotatably attached, the front wheel mechanism being pivotally attached to the frame, and having at least one wheel rotatably attached thereto: and further having a second handle attachment point; and
   c) a selectively attachable handle having a means for attaching to the second handle attachment point.

2. The device as described in claim 1 wherein the base of the cargo carrier further has a corrugate bottom.

3. The device as described in claim 2 wherein the corrugate bottom of the cargo carrier forms ribs and grooves running the length of the cargo carrier.

4. The device as described in claim 3 wherein the grooves of the corrugate bottom of the cargo carrier mate with the frame when assembled.

5. The device as described in claim 1 wherein the cargo carrier further includes a latch for locking the cargo carrier in a down position.

6. The device as described in claim 2 wherein the walls have unidirectional corrugations formed thereon.

7. The device as described in claim 1 wherein the cargo carrier further includes an openable cover to the cargo earner.

8. The device as described in claim 7 wherein the openable cover of the cargo carrier is bifurcated.

9. The device as described in claim 7 wherein each member of the bifurcated cover is selectively lockable in a position selected from the group consisting of open, partially closed, and closed.

10. The device as described in claim 7 wherein each member of the bifurcated cover is removable.

11. The device as described in claim 1 wherein the cargo carrier is constructed from a polymeric material.

12. The device as described in claim 1 wherein the frame is fabricated from tubes.

13. The device as described in claim 12 wherein the tubes are metal.

14. The device as described in claim 13 wherein the tubes are formed from an aluminum alloy.

15. The device as described in claim 1 wherein the frame is pivotally attached to the cargo carrier with a pair of removable pins.

16. The device as described in claim 1 wherein the cargo carrier may pivot over center to become self supporting in the dumped position.

17. The device as described in claim 15 wherein the pivot pins are attached to the cargo carrier proximate the center of gravity of the cargo earner.

18. The device as described in claim 1 wherein the handle is pivotable in a vertical plane.

19. The device as described in claim 1 wherein the handle is rotatable in a horizontal plane.

20. An apparatus for carrying cargo comprising:
   a) a tub shaped cargo container having upwardly extending walls for surrounding and containing cargo and having one of said walls extending upwardly at an acute angle forming a dumping surface; the cargo carrier further having a plurality of ribs and a plurality of grooves formed on the bottom thereof, and having a handle attachment point formed adjacent the dumping surface; the container further having a plurality of pivot tabs formed thereon;
   b) a frame having an inverted "U" shaped platform, the frame having a distal end and a proximal end, a "U" shaped rear axle affixed to the distal end of the frame, the rear axle having pivotal attachment points for pivotal attachment to the container; and the rear axle extending outwardly and thence downwardly and terminating in a means for attaching wheels; the rear axle further having a circular wheel attached to each end of the rear axle; an inverted "U" shaped front axle pivotally attached to the proximal end of the frame, the front axle extending outwardly and thence downwardly and terminating in a means for attaching wheels; the front axle further having a circular wheel attached to each end of the front axle; the front axle further having a triangular shaped sub-frame extending proximally therefrom; the sub-frame having a handle attachment point formed thereon; and
   c) an elongate handle having a "D" shaped proximal end and a distal end the distal end of the handle selectively attached pivotally to a handle attachment point.

21. The device as described in claim 20 wherein the rear axle has a forward angle and the pivotal attachment points are at the foremost point of the rear axle; and pivotal attachment points of the cargo carrier are near the center of gravity of the cargo carrier to facilitate dumping the cargo carrier.

* * * * *